(12) United States Patent
Murakami et al.

(10) Patent No.: US 11,724,321 B2
(45) Date of Patent: Aug. 15, 2023

(54) HOLE DRILLING MACHINE AND METHOD FOR DRILLING OVAL HOLE AND INNER-DIAMETER-CHANGING HOLE BY MEANS OF HOLE DRILLING MACHINE

(71) Applicant: ENSHU Limited, Hamamatsu (JP)

(72) Inventors: Munehiro Murakami, Hamamatsu (JP); Toshio Suzuki, Hamamatsu (JP); Taketo Nakamura, Hamamatsu (JP); Kazushige Morozumi, Hamamatsu (JP); Tatsunori Sato, Hamamatsu (JP); Yuya Masuda, Hamamatsu (JP); Daiki Ishizuka, Hamamatsu (JP)

(73) Assignee: ENSHU LIMITED, Hamamatsu (JP)

( * ) Notice: Subject to any disclaimer, the term of this patent is extended or adjusted under 35 U.S.C. 154(b) by 196 days.

(21) Appl. No.: 17/468,897

(22) Filed: Sep. 8, 2021

(65) Prior Publication Data

US 2021/0402491 A1 Dec. 30, 2021

Related U.S. Application Data

(62) Division of application No. 16/650,166, filed as application No. PCT/JP2019/026361 on Jul. 2, 2019, now Pat. No. 11,154,939.

(30) Foreign Application Priority Data

Jul. 24, 2018 (JP) ................. 2018-138685

(51) Int. Cl.
*B23B 41/04* (2006.01)
*B23B 41/12* (2006.01)
*B23B 41/06* (2006.01)
*B23B 35/00* (2006.01)

(52) U.S. Cl.
CPC .............. *B23B 41/04* (2013.01); *B23B 41/06* (2013.01); *B23B 41/12* (2013.01); *B23B 35/00* (2013.01); *B23B 2215/245* (2013.01)

(58) Field of Classification Search
CPC ......... B23B 41/04; B23B 41/06; B23B 41/12; B23B 2215/245
See application file for complete search history.

(56) References Cited

U.S. PATENT DOCUMENTS

| 2,844,053 | A | 7/1958 | Wagner et al. |
| 2,887,912 | A | 5/1959 | Beach |
(Continued)

FOREIGN PATENT DOCUMENTS

| DE | 4019704 A1 | 1/1991 |
| EP | 1918049 A2 | 5/2008 |
(Continued)

OTHER PUBLICATIONS

International Search Report dated Sep. 24, 2019 filed in PCT/JP2019/026361.

*Primary Examiner* — Eric A. Gates
(74) *Attorney, Agent, or Firm* — Pearne & Gordon LLP (57) ABSTRACT

Provided is a hole drilling machine and the method for drilling an oval hole and an inner-diameter-changing hole by means of the hole drilling machine, the machine and the method being configured so that the oval hole can be shaped with high accuracy and drilling of a complicated hole such as the inner-diameter-changing hole can be performed with high accuracy. A hole drilling machine 100 includes a spindle 101 and an auxiliary spindle 120 holding both end portions of a processing tool 102 having a cutting blade 103. The spindle 101 includes a spindle drive motor 106 configured to rotatably displace the processing tool 102 on a circular path, and a tool turnable-drive motor 105 configured to spin the processing tool 102. The auxiliary spindle 120 includes an auxiliary spindle drive motor 120b. In the auxiliary spindle drive motor 120b, a tool fitting portion 120a in which a tip end portion of the processing tool 102 is slidably fitted is synchronously rotatably driven on the (Continued)

same circular path as that for the spindle 101. A table reciprocatably-displacing mechanism 111 is provided between the spindle 101 and the auxiliary spindle 120. The table reciprocatably-displacing mechanism 111 reciprocatably displaces a work piece WK in an X-axis direction perpendicular to an axial direction of the spindle 101.

2 Claims, 7 Drawing Sheets

(56) References Cited

U.S. PATENT DOCUMENTS

| | | |
|---|---|---|
| 4,638,694 A | 1/1987 | Slee |
| 5,328,306 A | 7/1994 | Rehm et al. |
| 5,782,585 A | 7/1998 | Bathen |
| 6,631,771 B2 | 10/2003 | Hamamura et al. |
| 8,770,312 B2 | 7/2014 | Kume et al. |
| 10,391,564 B2 | 8/2019 | Park et al. |
| 2014/0277685 A1 | 9/2014 | Chen |

FOREIGN PATENT DOCUMENTS

| | | | |
|---|---|---|---|
| GB | 160602 A | * | 3/1921 |
| JP | S62-79903 A | | 4/1987 |
| JP | H10-509660 A | | 9/1998 |
| JP | H11-179605 A | | 7/1999 |
| JP | 2012-093995 A | | 5/2012 |
| JP | 2013-248709 A | | 12/2013 |

* cited by examiner

HOLE DRILLING MACHINE AND METHOD FOR DRILLING OVAL HOLE AND INNER-DIAMETER-CHANGING HOLE BY MEANS OF HOLE DRILLING MACHINE

TECHNICAL FIELD

The present invention relates to a hole drilling machine configured to shape, at a work piece, an oval hole and/or an inner-diameter-changing hole of which inner diameter changes along a hole depth direction and the method for drilling the oval hole and the inner-diameter-changing hole by means of the hole drilling machine.

BACKGROUND ART

Typically, a hole drilling machine configured to shape, at a work piece, an oval hole and/or an inner-diameter-changing hole of which inner diameter changes along a hole depth direction has been known. For example, in a hole punching machine disclosed in Patent Literature 1, an oval hole is shaped in such a manner that a work piece is reciprocatably displaced in a state in which a drill bit configured to cut the work piece is inserted into a hole of the work piece.

CITATION LIST

Patent Literature

PATENT LITERATURE 1: JP-A-2013-248709

However, in the hole punching machine described in Patent Literature 1, the work piece is reciprocatably displaced, and for this reason, there is a problem that a heavier work piece results in a more difficulty in implementation of precise reciprocatable displacement and lower oval hole drilling accuracy. Moreover, in such a typical hole punching machine, in a case where an inner-diameter-changing hole of which inner diameter changes in a depth direction is shaped for the oval hole, there is a problem that the control for reciprocatably displacing the work piece is complicated and it is extremely difficult to ensure processing accuracy.

The present invention has been made to handle the above-described problems. An object of the present invention is to provide a hole drilling machine and the method for drilling an oval hole and an inner-diameter-changing hole by means of the hole drilling machine, the machine and the method being configured so that the oval hole can be shaped with high accuracy and drilling of a complicated hole such as the inner-diameter-changing hole can be performed with high accuracy.

SUMMARY OF THE INVENTION

In order to achieve the object, a feature of the present invention is a hole drilling machine which includes: a work table configured to hold a work piece having a lower hole in a through-hole shape; a spindle formed in a shape of a rod penetrating the lower hole of the work piece held on the work table and configured to spin a processing tool, which holds a cutting blade configured to cut the work piece, about an axis while holding one end portion of the processing tool to turnably displace the cutting blade about the axis and rotatably drive an entirety of the processing tool on a circular path about a center axis at a position eccentric with a center axis of spinning; an auxiliary spindle having a tool fitting portion in which the other end side of the processing tool is slidably fitted and configured to rotatably drive the tool fitting portion on a circular path parallel with the circular path for the spindle; a spindle displacement mechanism configured to displace the spindle and the work table relative to each other in a y-axis direction as an axis direction of the spindle to decrease or increase a distance between the spindle and the work table; and a control apparatus configured to control actuation of each of the spindle, the auxiliary spindle, and the spindle displacement mechanism. The control apparatus turnably displaces the processing tool while displacing the processing tool in the y-axis direction in a rotatably-driven state, thereby shaping, at the work piece, at least one of an oval hole or an inner-diameter-changing hole of which inner diameter changes along a hole depth direction.

According to the feature of the present invention configured as described above, in the hole drilling machine, the processing tool turns by spinning while being rotatably driven on the circular path in a state in which both ends of the processing tool are supported by the spindle and the auxiliary spindle. With this configuration, the cutting blade approaches or separates front the work piece such that a cut amount changes. Thus, as compared to the case of reciprocatably displacing the work piece, the accuracy of position determination of the cutting blade can be improved, and high-accuracy processing can be performed. Moreover, according to the hole drilling machine of the present invention, the cutting blade approaches or separates from the work piece by turning of the processing tool by spinning, and the cut amount changes accordingly. Thus, a complicated hole such as the inner-diameter-changing hole can be also drilled with high accuracy.

In order to achieve the object, a feature of the present invention is a hole drilling machine which includes: a work table configured to hold a work piece having a lower hole in a through-hole shape; a spindle formed in a shape of a rod penetrating the lower hole of the work piece held on the work table and configured to spin a processing tool, which holds a cutting blade configured to cut the work piece, about an axis while holding one end portion of the processing tool to turnably displace the cutting blade about the axis and rotatably drive an entirety of the processing tool on a circular path about a center axis at a position eccentric with a center axis of spinning; an auxiliary spindle having a tool fitting portion in which the other end side of the processing tool is slidably fitted and configured to rotatably drive the tool fitting portion on a circular path parallel with the circular path for the spindle; a spindle displacement mechanism configured to displace the spindle and the work table relative to each other in a Y-axis direction as an axis direction of the spindle to decrease or increase a distance between the spindle and the work table; a table reciprocatably-displacing mechanism configured to reciprocatably displace the work table in an X-axis direction perpendicular to the Y-axis direction; and a control apparatus configured to control actuation of each of the spindle, the auxiliary spindle, the spindle displacement mechanism, and the table reciprocatably-displacing mechanism. The control apparatus turnably displaces the processing tool while displacing the processing tool in the Y-axis direction in a rotatably-driven state to shape, at the work piece, an inner-diameter-changing hole of which inner diameter changes along a hole depth direction, and reciprocatably displaces the work table in the X-axis direction while displacing the processing tool in the Y-axis direction in the rotatably-driven state to shape an oval hole at the work piece.

According to the feature of the present invention configured as described above, in the hole drilling machine, the processing tool turns by spinning while being rotatably driven on the circular path in a state in which both ends of the processing tool are supported by the spindle and the auxiliary spindle. With this configuration, the cutting blade approaches or separates from the work piece such that a cut amount changes. Thus, as compared to the case of reciprocatably displacing the work piece, the accuracy of position determination of the cutting blade can be improved, and high-accuracy processing can be performed. In this case, in the hole drilling machine, the cutting blade also approaches or separates from the work piece by reciprocatable displacement of the work table, and the cut amount changes accordingly. That is, the hole drilling machine according to the present invention turns the processing tool to shape the inner-diameter-changing hole and reciprocatably displaces the work table to shape the oval hole, thereby performing two types of shaping processing by two mechanisms. Thus, the hole drilling machine according to the present invention can also perform complicated hole drilling with high accuracy.

Further, another feature of the present invention is the hole drilling machine which includes: a work pressing mechanism arranged facing the work table independently of the work table and configured to press the work piece against the work table. In the work pressing mechanism, a pressing body configured to press the work piece against the work table follows, by the table reciprocatably-displacing mechanism, the work piece reciprocatably displaced in the X-axis direction.

According to another feature of the present invention configured as described above, in the hole drilling machine, the work pressing mechanism is further provided independently of the work table. In the work pressing mechanism, the pressing body configured to press the work piece against the work table follows, by the table reciprocatably-displacing mechanism, the work piece reciprocatably displaced in the X-axis direction. Thus, the hole drilling machine can stably support the work piece on the work table reciprocatably displaced in the X-axis direction, and can perform high-accuracy shaping processing.

Moreover, still another feature of the present invention is the hole drilling machine which further includes: a work position determination mechanism configured to hold a rod-shaped position determination body penetrating the lower hole of the work piece held on the work table such that the position determination body approaches and penetrates or separates from the lower hole; and a selective arrangement mechanism configured to integrally displace the auxiliary spindle and the work position determination mechanism to selectively arrange the auxiliary spindle and the work position determination mechanism such that the auxiliary spindle and the work position determination mechanism face the work piece held on the work table.

According to still another feature of the present invention configured as described above, the hole drilling machine further includes the work position determination mechanism and the selective arrangement mechanism. The work position determination mechanism holds the rod-shaped position determination body penetrating the lower hole of the work piece held on the work table such that the position determination body approaches and penetrates or separates from the lower hole. Further, the selective arrangement mechanism integrally displaces the work position determination mechanism and the auxiliary spindle to selectively arrange the work position determination mechanism and the auxiliary spindle such that the work position determination mechanism and the auxiliary spindle face the work piece held on the work table. With this configuration, the hole drilling machine can perform, by position determination of one of the work position determination mechanism or the auxiliary spindle with respect to the work piece on the work table, retreating of the other one of the work position determination mechanism or the auxiliary spindle. Thus, a working efficiency can be improved.

Moreover, the present invention can be implemented not only as an invention relating to a hole drilling apparatus but also as an invention relating to the method for drilling an oval hole and an inner-diameter-changing hole by means of a hole drilling machine.

Specifically, the method for drilling an oval hole and an inner-diameter-changing hole by means of a hole drilling machine is a method for drilling, at a work piece, an oval hole and an inner-diameter-changing hole of which inner diameter changes along a hole depth direction by means of a hole drilling machine, the hole drilling machine including: a work table configured to hold the work piece having a lower hole in a through-hole shape; a spindle formed in a shape of a rod penetrating the lower hole of the work piece held on the work table and configured to spin a processing tool, which holds a cutting blade configured to cut the work piece, about an axis while holding one end portion of the processing tool to turnably displace the cutting blade about the axis and rotatably drive an entirety of the processing tool on a circular path about a center axis at a position eccentric with a center axis of spinning; an auxiliary spindle having a tool fitting portion in which the other end side of the processing tool is slidably fitted and configured to rotatably drive the tool fitting portion on a circular path parallel with the circular path for the spindle; a spindle displacement mechanism configured to displace the spindle and the work table relative to each other in a Y-axis direction as an axis direction of the spindle to decrease or increase a distance between the spindle and the work table; a table reciprocatably-displacing mechanism configured to reciprocatably displace the work table in an X-axis direction perpendicular to the Y-axis direction; and a control apparatus configured to control actuation of each of the spindle, the auxiliary spindle, the spindle displacement mechanism, and the table reciprocatably-displacing mechanism. The method preferably includes, causing the control apparatus to turnably displace the processing tool while displacing the processing tool in the Y-axis direction in a rotatably-driven state to shape the inner-diameter-changing hole at the work piece and to reciprocatably displace the work table in the X-axis direction while displacing the processing tool in the Y-axis direction in the rotatably-driven state to shape the oval hole at the work piece.

According to such a configuration, features and advantageous effects similar to those of the above-described invention relating to the hole drilling apparatus can be expected from the method for drilling the oval hole and the inner-diameter-changing hole by means of the hole drilling machine.

DESCRIPTION OF THE EMBODIMENTS

Figure 1:
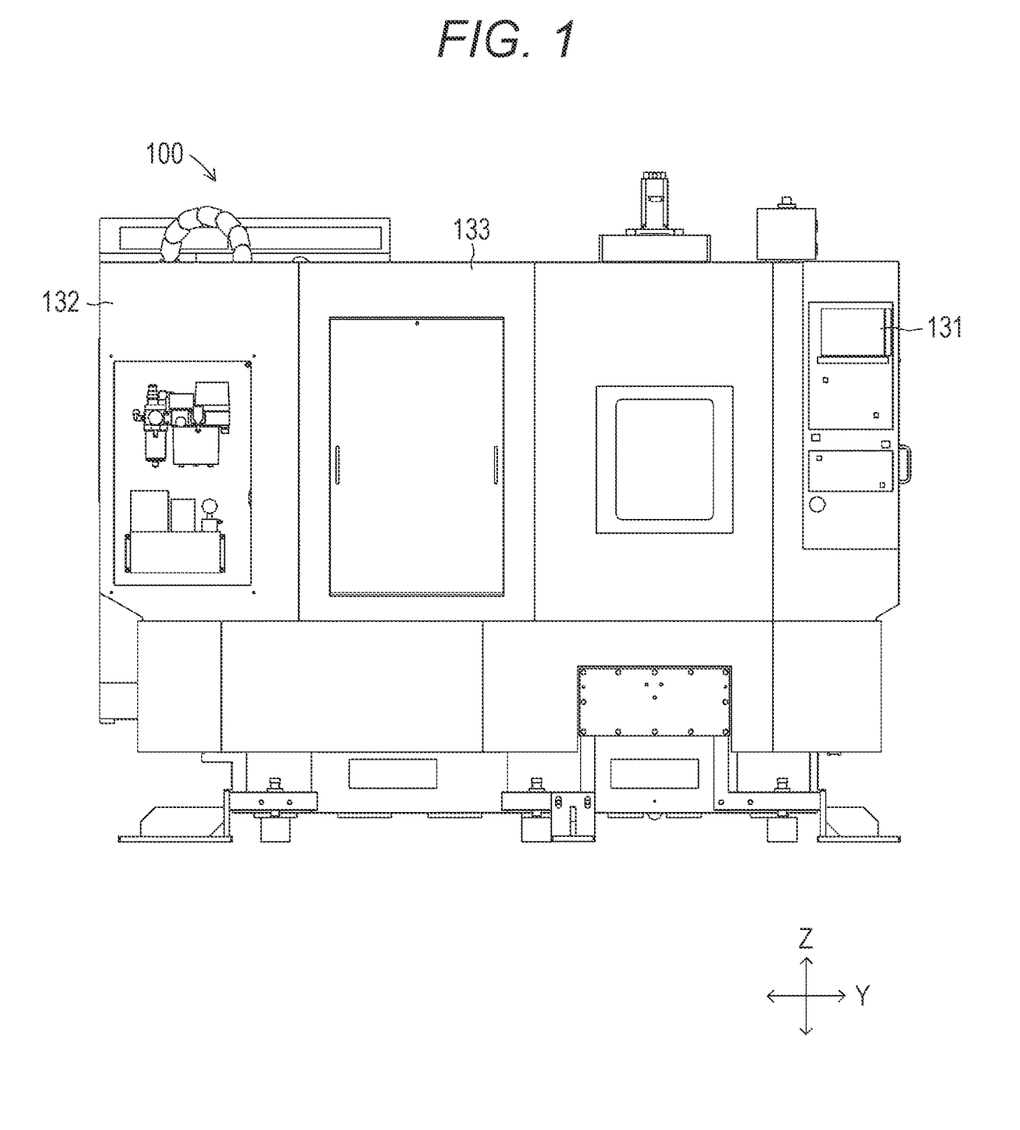
FIG. 1 is a front view illustrating the outline of are external configuration of a hole drilling machine according to one embodiment of the present invention.
Figure 2:
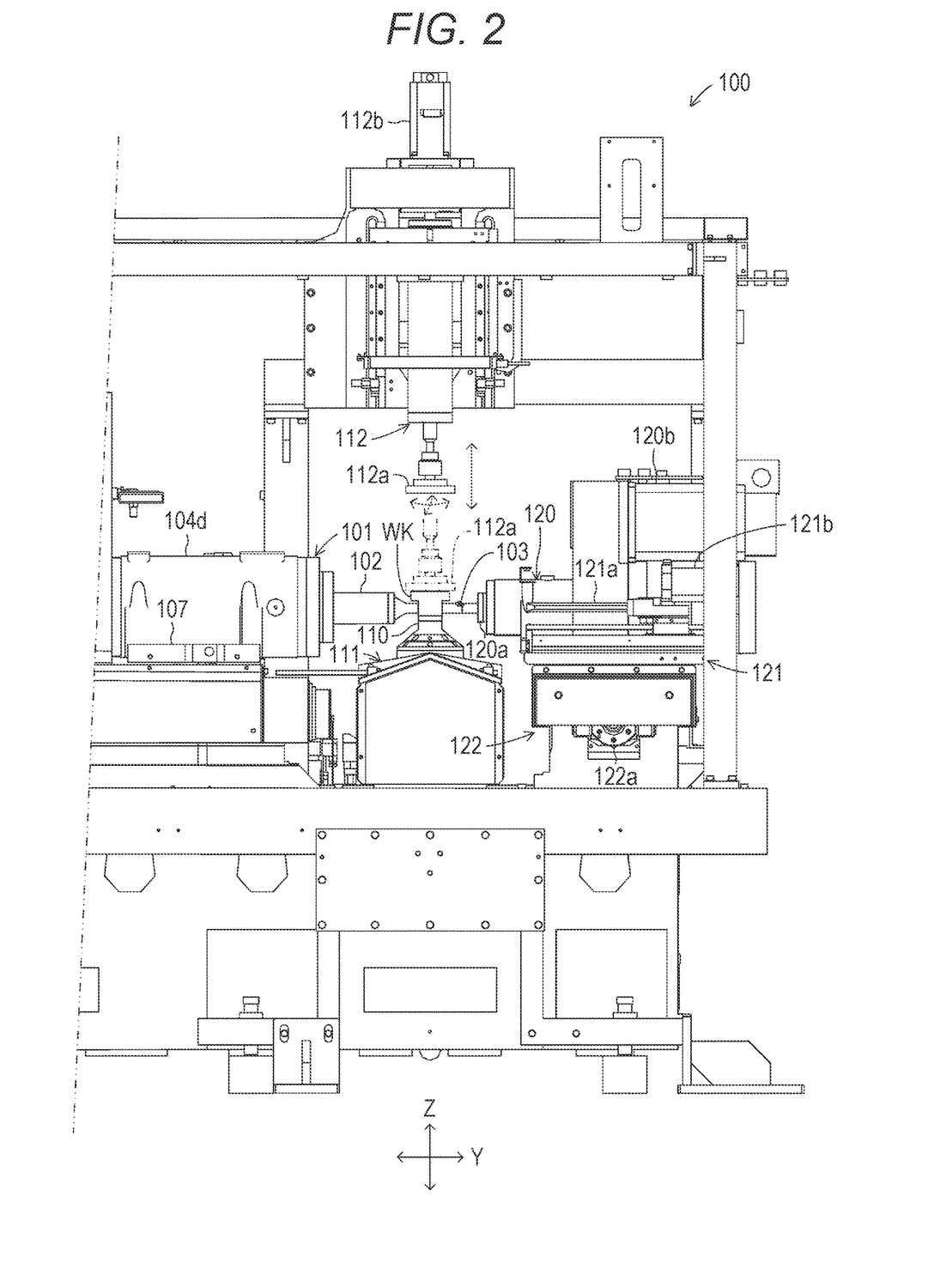
FIG. 2 is a partially-broken enlarged front view of a main portion in an internal structure, FIG. 2 illustrating the outline of the main portion without illustrating an exterior cover of the hole drilling machine illustrated in FIG. 1.
Figure 3:
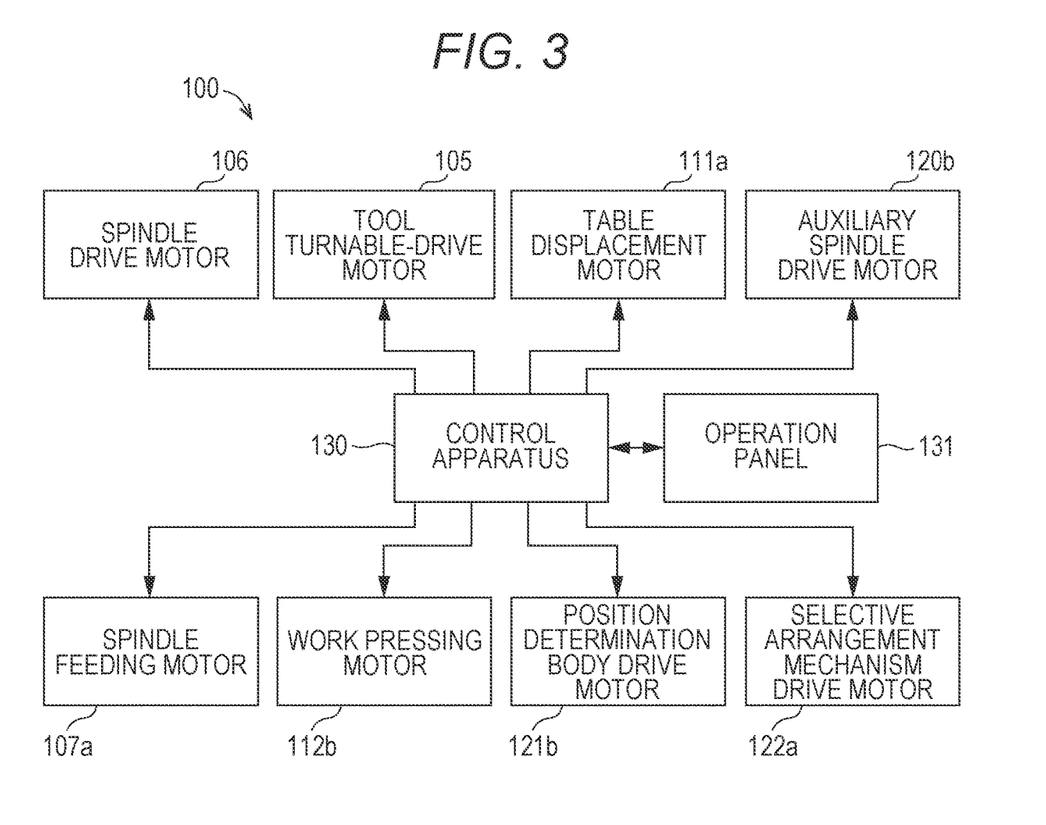
FIG. 3 is a block diagram of a control system for controlling actuation of the hole drilling machine illustrated in FIG. 1.

Hereinafter, one embodiment of a hole drilling machine and the method for drilling an oval hole and an inner-diameter-changing hole by means of the hole drilling machine according to the present invention will be described with reference to the drawings. FIG. 1 is a front view illustrating the outline of an external configuration of a hole drilling machine 100 according to the present invention. Moreover, FIG. 2 is a partially-broken enlarged front view of a main portion in an internal structure. FIG. 2 illustrating the outline of the main portion without illustrating an exterior cover 132 of the hole drilling machine 100 illustrated in FIG. 1. Further, FIG. 3 is a block diagram of a control system for controlling actuation of the hole drilling machine 100 illustrated in FIG. 1. Note that for the sake of easy understanding of the present invention, the figures used as a reference in the present specification are schematically illustrated, and some components are exaggeratingly illustrated, for example. For this reason, dimensions, ratios and the like among the components vary in some cases.

Figure 4:
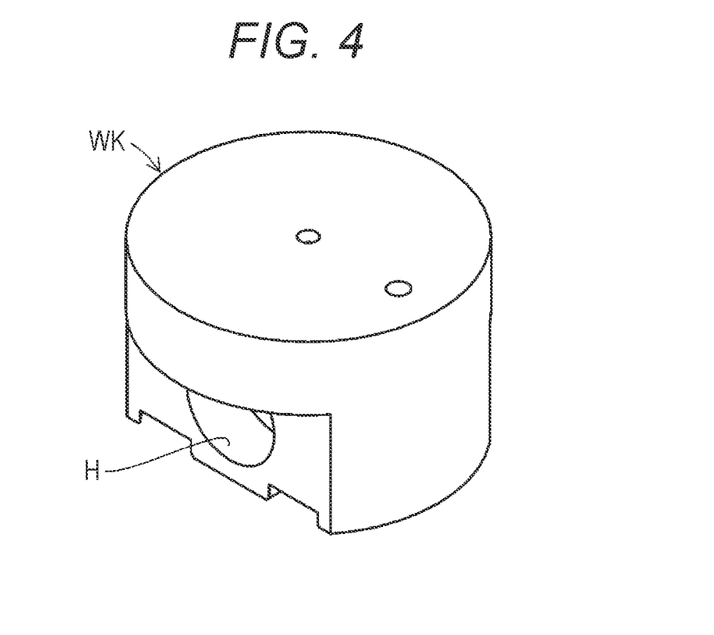
FIG. 4 is a perspective view illustrating the outline of an external configuration of a work piece as a target for processing by the hole drilling machine illustrated in FIG. 1.
Figure 5:
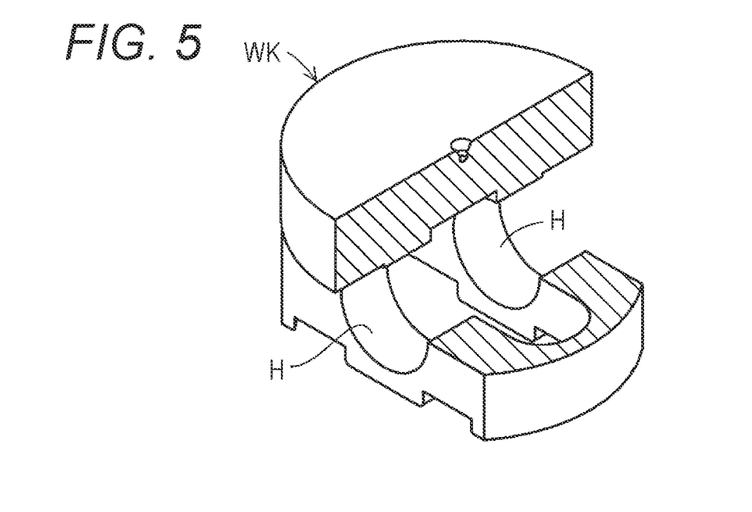
FIG. 5 is a partially-broken perspective view illustrating the outline of an internal structure of the work piece illustrated in FIG. 4.

The hole drilling machine 100 is a machining apparatus, and performs cutting processing while moving, by computer control (NC control), a processing tool 102 relative to a work piece WK including a piston in a reciprocating engine (not shown) to shape an oval through-hole of which inner diameter changes in an axial direction at the work piece WK. In the present embodiment, the work piece WK is, as illustrated in each of FIGS. 4 and 5, a piston slidably reciprocating in a cylinder in the reciprocating engine.

In this case, a lower hole H for shaping the inner-diameter-changing hole is shaped in advance at the work piece WK by separate processing. The inner-diameter-changing hole is the above-described oval hole as the oval through-hole and a through-hole of which inner diameter increases or decreases along a hole depth direction. For shaping a pin hole, to which a connecting rod is to be coupled, at the work piece WK including the piston, the lower hole H is, as a through-hole having a smaller diameter than that of the pin hole, shaped in advance before processing by the hole drilling machine 100. That is, the hole drilling machine 100 is a cutting processing apparatus for eventually shaping the pin hole, to which the connecting rod is to be coupled, at the work piece WK including the piston.

Configuration of Hole Drilling Machine 100

The hole drilling machine 100 includes a spindle 101. The spindle 101 is a mechanical apparatus for holding and rotatably driving the processing tool 102. The spindle 101 mainly includes each of a tool holding mechanism 104, a tool turnable-drive motor 105, and a spindle drive motor 106.

Figure 6:
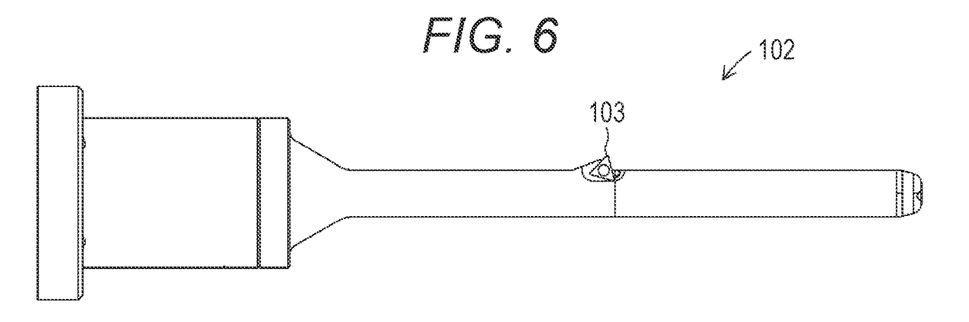
FIG. 6 is a side view illustrating the outline of an external configuration of a processing tool supported on a spindle and an auxiliary spindle in the hole drilling machine illustrated in FIG. 1.

As illustrated in FIG. 6, the processing tool 102 described herein is a tool configured to detachably hold a chip-shaped cutting blade 103 configured to cut the work piece WK. The processing tool 102 is formed in such a manner that a metal material is formed into a rod shape. Of the processing tool 102, one (the left side as viewed in the figure) end portion is, in this case, detachably held on the spindle 101, and the other (the right side as viewed in the figure) end portion is detachably fitted in a later-described auxiliary spindle 120. Moreover, the cutting blade 103 is held in a state in which the cutting blade 103 projects outward in a radial direction at a center portion of the processing tool 102, which extends in the rod shape, in a longitudinal direction thereof.

Figure 7:
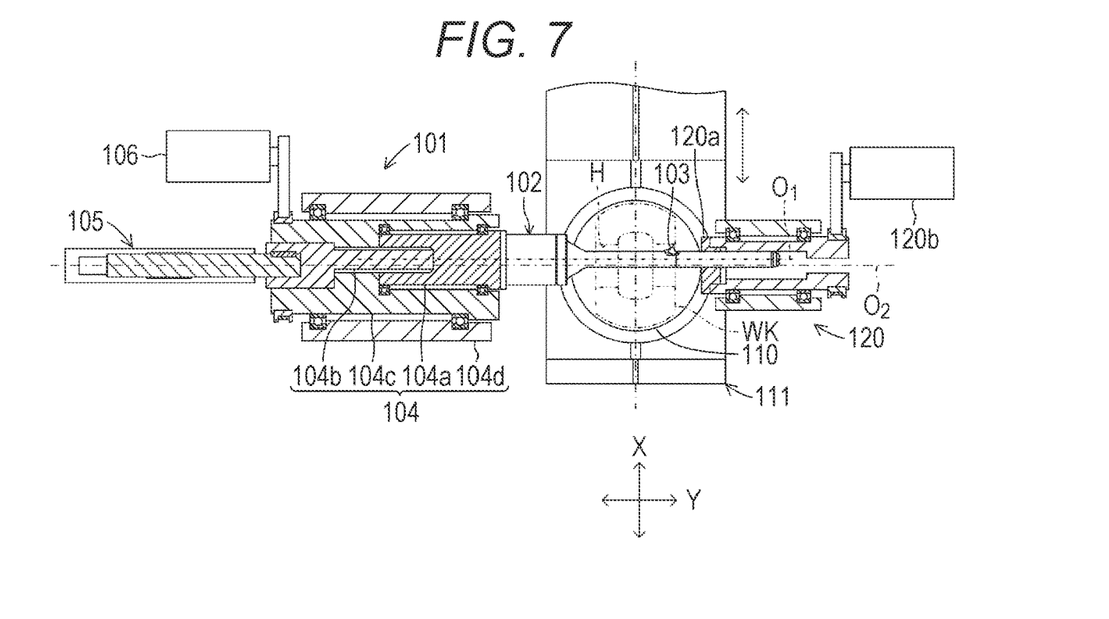
FIG. 7 is a plan view schematically illustrating the outline of an internal structure of the main portion of the hole drilling machine illustrated in FIG. 2.

The tool holding mechanism 104 is a mechanical apparatus, and as illustrated in FIG. 7, holds the processing tool 102 together with the auxiliary spindle 120 and spins the processing tool 102 about the axis thereof to turnably displace the cutting blade 103 about the same axis. Further, the tool holding mechanism 104 continuously displaces and rotatably drives the entirety of the processing tool 102 on a circular path about a center axis $O_2$ at a position eccentric with the center axis $O_1$ of the above-described spinning. Specifically, the tool holding mechanism 104 mainly includes each of a tool holding tube 104a, a motion converter 104b, an inner tube 104c, and an outer tube 104d. Note that the work piece WK is indicated by a chain double-dashed line in FIG. 7.

The tool holding tube 104a is a part to the right end side of which one (the left side as viewed in the figure) end portion of the processing tool 102 is detachably coupled as viewed in the figure. The tool holding tube 104a is formed in such a manner that a metal material is formed into a cylindrical shape. The tool holding tube 104a is, in the inner tube 104c, held in a rotatable state with the motion converter 104b being connected to the left end side of the tool holding tube 104a as viewed in the figure.

The motion converter 104b is a mechanism for turning the tool holding tube 104a about the center axis of the inner tube 104c in the inner tube 104c. The motion converter 104b is configured to convert linear reciprocating motion of the tool turnable-drive motor 105 into spinning motion of the tool holding tube 104a. Specifically, in the motion converter 104b, a spiral groove configured to engage with an inner peripheral surface of the tool holding tube 104a is, for example, formed at an outer peripheral surface of a rod-shaped slider slidably reciprocating along an axis direction of the tool holding tube 104a by the tool turnable-drive motor 105. With this configuration, the motion converter 104b turns, by slidable reciprocation of the slider, the tool holding tube 104a to each of one direction about the axis and the other direction as the opposite direction of such one direction. In the present embodiment, the motion converter 104b turns the tool holding tube 104a by 180°.

The tool turnable-drive motor 105 is an electric motor for turning the tool holding tube 104a in a spinning state through the motion converter 104b. Actuation of the tool turnable-drive motor 105 is controlled by a later-described control apparatus 130. In the present embodiment, the tool turnable-drive motor 105 includes a linear motor. Note that the tool turnable-drive motor 105 may include a rotary drive electric motor such as a servo motor. In this case, the motion converter 104b may include a gear mechanism configured to convert rotation motion of the tool turnable-drive motor 105 into spinning motion of the tool holding tube 104a.

The inner tube 104c is a part configured to hold the tool holding tube 104a in a turnably-slidable state together with the motion converter 104b. The inner tube 104c is formed in such a manner that a metal material is formed into a cylindrical shape. The inner tube 104c is formed such that the axial center of a cylindrical portion housing the tool holding tube 104a is shifted from the axial center of an outer peripheral surface of the inner tube 104c. Thus, the inner tube 104c holds the processing tool 102 at an eccentric position. That is, the axial center of the cylindrical portion of the inner tube 104c housing the tool holding tube 104a is the center axis $O_1$ of spinning of the processing tool 102. The axial center of the outer peripheral surface of the inner tube 104c is the center axis $O_2$ of rotation of the processing tool 102. The inner tube 104c is, in the outer tube 104d, held in a rotatable state with the spindle drive motor 106 being connected to the left end side of the inner tube 104c as viewed in the figure.

The spindle drive motor 106 is an electric motor for rotatably driving the inner tube 104c. Actuation of the spindle drive motor 106 is controlled by the control apparatus 130. In the present embodiment, the spindle drive motor 106 includes a servo motor.

The outer tube 104d is a part holding the inner tube 104c in the rotatable state through a bearing. The outer tube 104d is formed in such a manner that a metal material is formed into a tubular shape. The outer tube 104d is fixed onto a spindle feeding mechanism 107 in the hole drilling machine 100.

The spindle feeding mechanism 107 is a mechanical apparatus for causing the entirety of the spindle 101 to approach or separate from a later-described work table 110, i.e., reciprocatably displacing the entirety of the spindle 101 in a Y-axis direction. The spindle feeding mechanism 107 is configured such that a plate-shaped spindle table supported on a base of the hole drilling machine 100 through parts such as a linear guide (not shown) is reciprocatably displaced by a spindle feeding motor 107a. In this case, the spindle feeding motor 107a includes a servo motor of which actuation is controlled by the control apparatus 130.

The work table 110 is a part for supporting the work piece WK. The work table 110 is formed in such a manner that a metal material is formed into a truncated conical shape. The work table 110 is fixed onto a table reciprocatably-displacing mechanism 111 in the hole drilling machine 100. Moreover, a work pressing mechanism 112 is provided above the work table 110.

The table reciprocatably-displacing mechanism 111 is a mechanical apparatus for reciprocatably displacing the work table 110 in an X-axis direction perpendicular to the Y-axis direction. The table reciprocatably-displacing mechanism 111 is configured such that a plate-shaped table support supported on the base of the hole drilling machine 100 through parts such as a linear guide (not shown) is reciprocatably displaced by a table displacement motor 111a. In this case, the table displacement motor 111a includes a linear motor of which actuation is controlled by the control apparatus 130.

The work pressing mechanism 112 is a mechanical apparatus for pressing the work piece WK placed on the work table 110 against a work table 110 side to clamp the work piece WK. The work pressing mechanism 112 is configured such that a pressing body 112a configured to press the work piece WK placed on the work table 110 approaches or separates from the work table 110 by a work pressing motor 112b (see a dashed arrow in FIG. 2).

In this case, the pressing body 112a is coupled to a support shaft extending from the work pressing motor 112b through a ball joint (not shown). The pressing body 112a is swingable (see the dashed arrow in FIG. 2) relative to the support shaft in each of the X-axis direction and the Y-axis direction. Moreover, the work pressing motor 112b includes a servo motor of which actuation is controlled by the control apparatus 130. The work pressing mechanism 112 is fixed onto the base of the hole drilling machine 100 through a frame member with the work pressing mechanism 112 being positioned above the work table 110. Note that the pressing body 112a may be formed swingably in at least a reciprocatable-displacement direction (the X-axis direction in the present embodiment) of the table reciprocatably-displacing mechanism 111.

Figure 8:
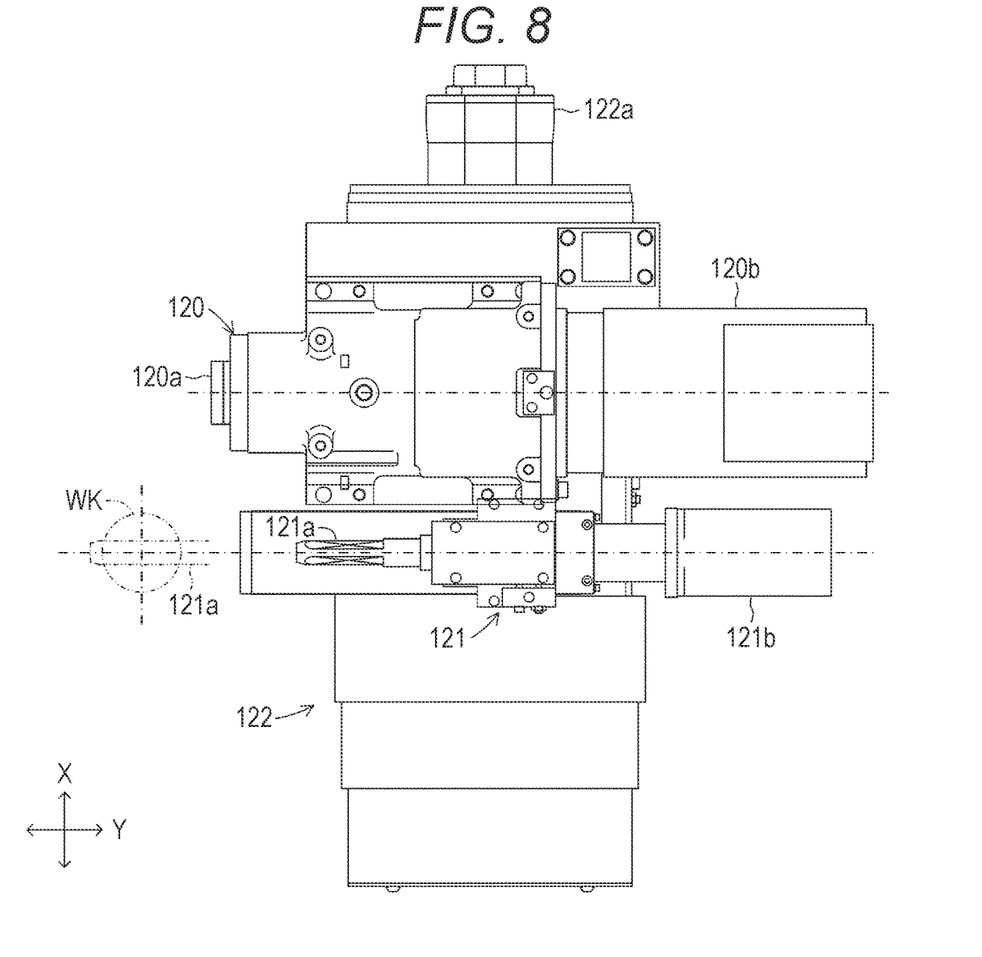
FIG. 8 is a plan view illustrating the outline of external configurations of the auxiliary spindle, a work position determination mechanism, and a selective arrangement mechanism illustrated in FIG. 2.

As illustrated in FIG. 8, the auxiliary spindle 120 is a mechanical apparatus configured to support the processing tool 102 held by the spindle 101. The auxiliary spindle 120 mainly includes each of a tool fitting portion 120a and an auxiliary spindle drive motor 120b. The tool fitting portion 120a is a portion in which one of both end portions of the processing tool 102 (on the right side as viewed in the figure) opposite to an end portion held on the spindle 101 is fitted in a slidable state. The tool fitting portion 120a is formed in such a manner that a metal material is formed into a cylindrical shape. In this case, the tool fitting portion 120a is provided to open at a spindle-101-side surface of the auxiliary spindle 120.

The tool fitting portion 120a is rotatably driven on the same axis as that of the tool holding tube 104a rotatably driven on an eccentric circular path by the tool holding mechanism 104. The auxiliary spindle drive motor 120b is an electric motor for rotatably driving the tool fitting portion 120a. Actuation of the auxiliary spindle drive motor 120b is controlled by the control apparatus 130. In this case, the control apparatus 130 controls the auxiliary spindle drive motor 120b such that the auxiliary spindle drive motor 120b is rotatably driven in synchronization with the spindle drive motor 106. In the present embodiment, the auxiliary spindle drive motor 120b includes a servo motor. In this case, the servo motor having the same specifications as those of the spindle drive motor 106 is used as the auxiliary spindle drive motor 120b so that a difference in synchronous control of both motors and deceleration behavior upon blackout can be reduced and a synchronous state can be easily maintained.

The auxiliary spindle 120 is, together with a work position determination mechanism 121, supported on a selective arrangement mechanism 122. The work position determination mechanism 121 is a mechanical apparatus for position-determining the work piece WK on the work table 110. The work position determination mechanism 121 is configured such that a position determination body 121a is advanced toward or retreated from a spindle 101 side by a position determination body drive motor 121b.

The position determination body 121a is a part inserted with the position determination body 121a being fitted in the lower hole H as a processing target portion formed at the work piece WK. The position determination body 121a is provided to extend in the Y-axis direction in such a manner that a metal material is formed into a round rod shape. The position determination body drive motor 121b is an electric motor for advancing the position determination body 121a toward the spindle 101 side or retreating the position determination body 121a from the spindle 101 side. Actuation of the position determination body drive motor 121b is controlled by the control apparatus 130. In the present embodiment, the position determination body drive motor 121b includes a servo motor.

The selective arrangement mechanism 122 is a mechanical apparatus for selectively position-determining one of the auxiliary spindle 120 or the work position determination mechanism 121 with respect to the work piece WK on the work table 110. The selective arrangement mechanism 122 is configured such that a plate-shaped support supported on the base of the hole drilling machine 100 through parts such as a linear guide (not shown) is reciprocatably displaced along the X-axis direction by a selective arrangement mechanism drive motor 122a. In this case, the selective arrangement mechanism drive motor 122a includes a servo motor of which actuation is controlled by the control apparatus 130.

The control apparatus 130 includes a microcomputer having a CPU, a ROM, a RAM and the like. The control apparatus 130 controls actuation of the entirety of the hole drilling machine 100 in a comprehensive manner, and executes a not-shown processing program (a so-called numerical control (NC) program) prepared by an operator to perform machining for the work piece WK.

Specifically, the control apparatus 130 controls actuation of each of the tool turnable-drive motor 105, the spindle drive motor 106, the spindle feeding motor 107a, the table displacement motor 111a, the work pressing motor 112b, the auxiliary spindle drive motor 120b, the position determination body drive motor 121b, and the selective arrangement mechanism drive motor 122a, thereby displacing the cutting blade 103 held on the processing tool 102 in the X-axis direction and the Y-axis direction relative to the work piece WK. In this manner, the control apparatus 130 performs, for the work piece WK, the processing of cutting each of the oval hole and the inner-diameter-changing hole.

An operation panel 131 is connected to the control apparatus 130. The operation panel 131 includes an input apparatus configured to receive an instruction from the operator to input such an instruction to the control apparatus 130 and having a switch group, and a liquid crystal display apparatus configured to display an actuation status of the control apparatus 130. The operation panel 131 is provided at the exterior cover 132 forming an outer surface of the hole drilling machine 100.

At the exterior cover 132, an opening/closing door 133 is provided at a front surface of the hole drilling machine 100 on a front side thereof. The opening/closing door 133 is opened/closed by the operator, and faces the spindle 101 and the work table 110. Further, the hole drilling machine 100 includes, for example, a power supply configured to supply electricity for actuating each of the tool turnable-drive motor 105, the spindle drive motor 106, the spindle feeding motor 107a, the table displacement motor 111a, the work pressing motor 112b, the auxiliary spindle drive motor 120b, the position determination body drive motor 121b, the selective arrangement mechanism drive motor 122a, and the control apparatus 130, and an external interface for electrically connecting external equipment to the control apparatus 130. Description of these configurations not directly relating to the present invention will be omitted.

Actuation of Hole Drilling Machine 100

Next, actuation of the hole drilling machine 100 configured as described above will be described. The hole drilling machine 100 is arranged independently or incorporated into a processing line in a factory for processing the work piece WK, thereby implementing one step of processing the work piece WK. In the present embodiment, only matters regarding the steps of drilling the oval hole and the inner-diameter-changing hole at the work piece WK will be described. Description of other processing steps not directly relating to the present invention will be omitted.

First, the operator operates the operation panel 131 to power on the hole drilling machine 100. Accordingly, the hole drilling machine 100 executes a not-shown predetermined control program stored in advance in the ROM of the control apparatus 130 to control actuation of the spindle feeding motor 107a of the spindle feeding mechanism 107, thereby displacing the processing tool 102 to the left end side as viewed in the figure and returning the processing tool 102 to an original point. Thereafter, the hole drilling machine 100 is brought into a standby state in which the hole drilling machine 100 waits for the instruction from the operator.

Next, the operator sets the work piece WK on the work table 110 of the hole drilling machine 100. Specifically, the operator places the work piece WK on the work table 110. In this case, the work piece WK is placed on the work table 110 in such a direction that a piston crown faces the work pressing mechanism 112 and the lower hole H is positioned substantially on the axis of the processing tool 102. Thus, in a processing area of the hole drilling machine 100, the positions of the work piece WK in the Y-axis direction, the X-axis direction, and a Z-axis direction as an upper-lower direction perpendicular to each of these axes as viewed in the figure are determined.

Subsequently, the operator operates the operation panel 131 to instruct the control apparatus 130 to clamp the work piece WK. In response to such an instruction, the control apparatus 130 executes a not-shown work clamp control program, thereby executing the processing of clamping the work piece WK. Such processing of clamping the work piece WK is performed in such a manner that the control apparatus 130 executes the following sub-steps 1 to 6.

Sub-Step 1: the control apparatus 130 controls actuation of the selective arrangement mechanism drive motor 122a of the selective arrangement mechanism 122 to arrange the position determination body 121a of the work position determination mechanism 121 with the position determination body 121a facing the work piece WK (indicated by a chain double-dashed line in FIG. 8) on the work table 110.

Sub-Step 2: the control apparatus 130 subsequently controls actuation of the work pressing motor 112b of the work pressing mechanism 112 to lower the pressing body 112a and press and temporarily fix the work piece WK on the work table 110 with small force allowing direction displacement (see a chain double-dashed line in FIG. 2).

Sub-Step 3: the control apparatus 130 subsequently controls actuation of the position determination body drive motor 121b of the work position determination mechanism 121 to displace the position determination body 121a to the spindle 101 side and cause the position determination body 121a to penetrate the lower hole H of the work piece WK (see the chain double-dashed line in FIG. 8). In this manner, the axis of the lower hole H and the rotation center axis of the spindle 101 are coincident with each other in the work piece WK on the work table 110.

Sub-Step 4: the control apparatus 130 subsequently controls actuation of the work pressing motor 112b of the work pressing mechanism 112 to increase the force of pressing the work piece WK by the pressing body 112a and bring a fixed state not allowing displacement on the work table 110.

Sub-Step 5: the control apparatus 130 subsequently controls actuation of the position determination body drive motor 121b to displace the position determination body 121a to the opposite side of the spindle 101 side and pull the position determination body 121a out of the lower hole H of the work piece WK. In this manner, the work piece WK is clamped on the work table 110 with the axis of the lower hole H and the rotation center axis of the spindle 101 being coincident with each other.

Sub-Step 6: the control apparatus 130 subsequently controls actuation of the selective arrangement mechanism drive motor 122a to arrange the auxiliary spindle 120 such that the auxiliary spindle 120 faces the work piece WK on the work table 110.

Next, the operator operates the operation panel 131 to instruct the control apparatus 130 to drill the oval hole and the inner-diameter-changing hole at the work piece WK. In response to such an instruction, the control apparatus 130 executes a not-shown cutting processing control program to execute the cutting processing for the work piece WK.

First, the control apparatus 130 controls actuation of the spindle feeding motor 107a of the spindle feeding mechanism 107 to displace the entirety of the spindle 101 to an auxiliary spindle 120 side and cause the processing tool 102 to penetrate the lower hole H of the work piece WK. Thereafter, the control apparatus 130 fits a tip end portion of the processing tool 102 in the tool fitting portion 120a of the auxiliary spindle 120. Accordingly, the processing tool 102 is brought into such a state that both end portions are supported on the spindle 101 and the auxiliary spindle 120 with the processing tool 102 penetrating the work piece WK on the work table 110 in the Y-axis direction.

Next, the control apparatus 130 controls actuation of each of the spindle 101, the spindle feeding mechanism 107, the table reciprocatably-displacing mechanism 111, and the auxiliary spindle 120 to perform the processing cutting the oval hole and the inner-diameter-changing hole at the work piece WK. Specifically, the control apparatus 130 rotatably drives the spindle drive motor 106 and the auxiliary spindle drive motor 120b in synchronization with each other, thereby controlling actuation of the spindle feeding motor 107a in a state in which the entirety of the processing tool 102 is rotated about the center axis $O_2$. Accordingly, the processing tool 102 is displaced relative to the work piece WK in the Y-axis direction.

Figure 9:
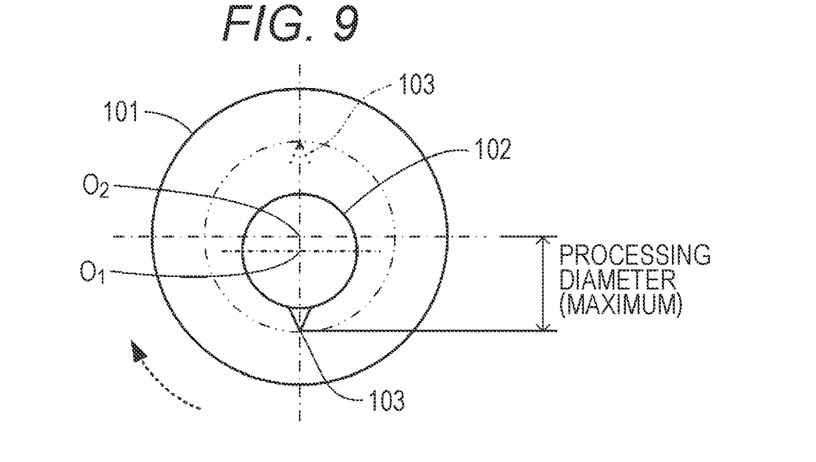
FIG. 9 is a schematic view for describing a state in which a cutting blade of the processing tool illustrated in FIG. 2 protrudes outward in a radial direction at a maximum.
Figure 10:
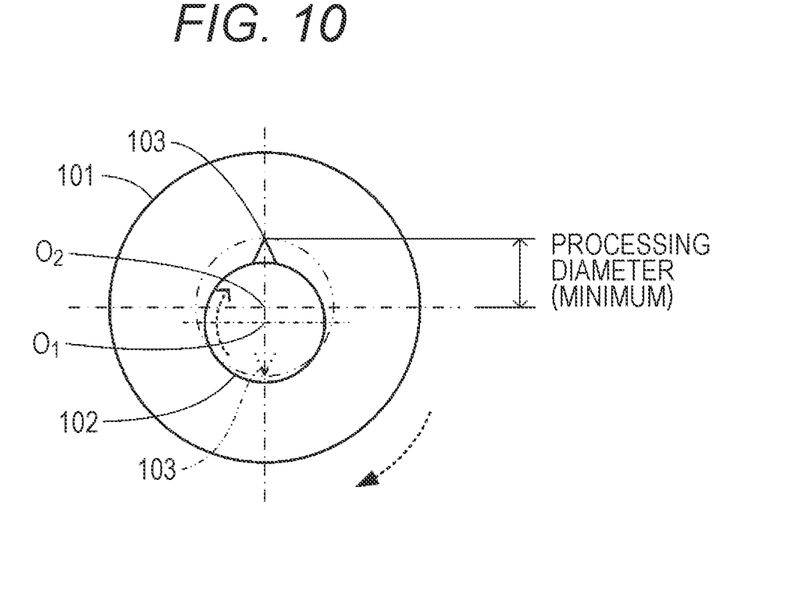
FIG. 10 is a schematic view for describing a state in which the cutting blade protrudes outward in the radial direction at a minimum by turning of the processing tool illustrated in FIG. 9 by spinning.

In this case, as illustrated in each of FIGS. 9 and 10, the control apparatus 130 controls, in the course of displacing the processing tool 102 in the Y-axis direction, actuation of the tool turnable-drive motor 105 to spin the processing tool 102 about the center axis $O_1$, thereby changing the position of the cutting blade 103 in the radial direction. More specifically, the control apparatus 130 controls actuation of the tool turnable-drive motor 105 such that the cutting blade 103 is retreated inward in the radial direction as moving in an inward direction from each of two outer openings of the lower hole H of the work piece WK.

Accordingly, the inner-diameter-changing hole of which inner diameter decreases in the inward direction from each of two outer openings is shaped at the lower hole H of the work piece WK. In the present embodiment, the control apparatus 130 turnably displaces the processing tool 102 by 180° so that the amount of outward protrusion of the cutting blade 103 in the radial direction can be adjusted from the maximum amount to the minimum amount. Note that in FIGS. 9 and 10, a rotation direction of the spindle 101 is indicated by a dashed arrow, and the path of rotatable displacement of the cutting blade 103 is indicated by a chain double-dashed line. Moreover, in FIG. 10, turnable displacement of the processing tool 102 is indicated by a dashed arrow.

Figure 11:
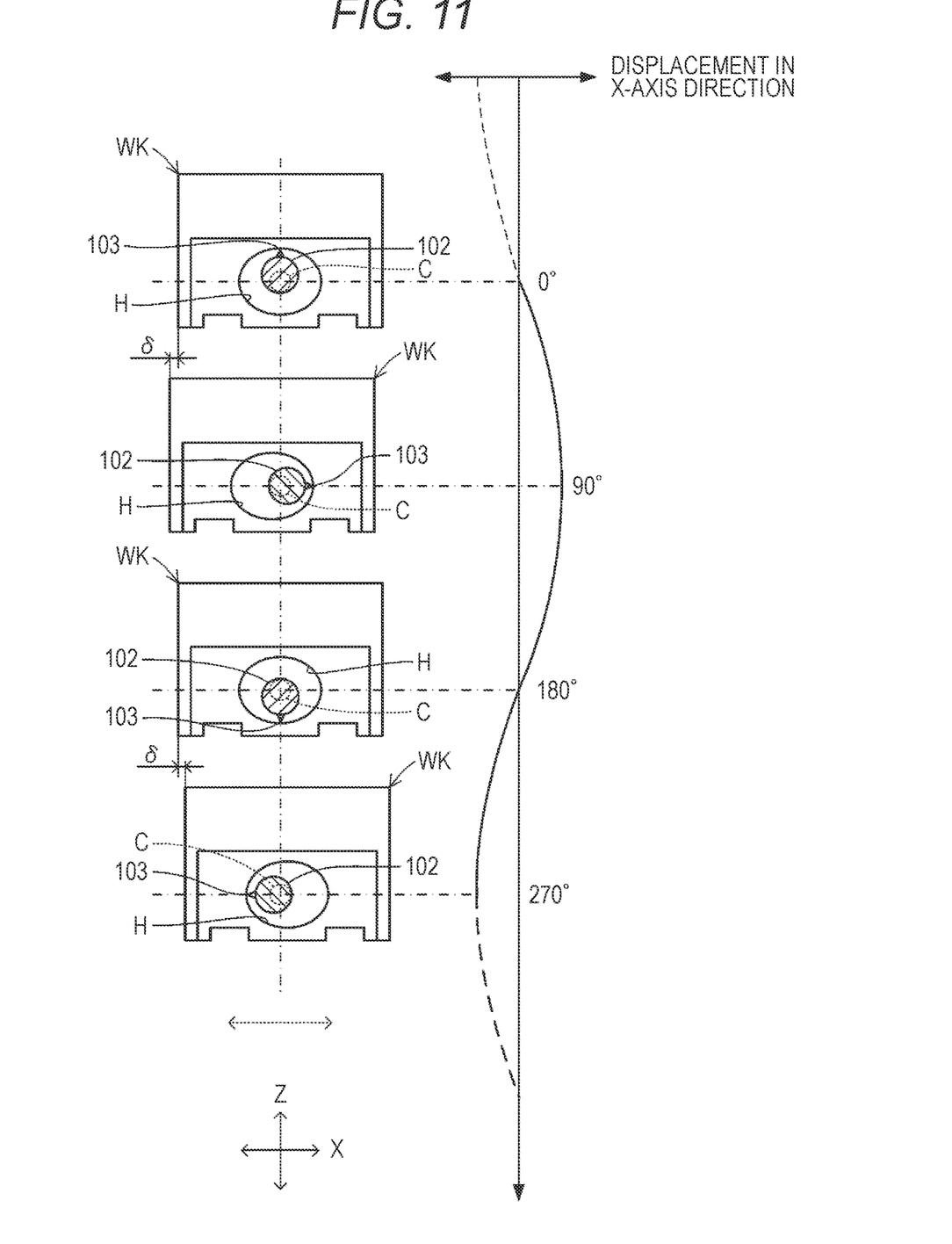
FIG. 11 is a schematic view for describing a vibration (displacement) state of a processing target portion on a work table with respect to a displacement position of the processing tool illustrated in FIG. 2 on a circular path (a dashed circle).

Upon shaping of the inner-diameter-changing hole, the control apparatus 130 reciprocatably displaces the work table 110 in the X-axis direction according to the position of the processing tool 102 about the center axis $O_2$, as illustrated in FIG. 11. More specifically, the control apparatus 130 controls actuation of the table displacement motor 111a such that an inner surface of the lower hole H of the work piece WK repeatedly approaches and separates from the cutting blade 103 every time the processing tool 102 rotates by 90° on a circular path C about the rotary drive center axis $O_2$ of the spindle 101 and the auxiliary spindle 120. Accordingly, the control apparatus 130 vibrates the work table 110 in the X-axis direction with a displacement amount (see dashed arrows in FIGS. 7 and 11).

In this case, the pressing body 112a presses the work piece WK against the work table 110 while following reciprocatable displacement of the work piece WK on the work table 110. Accordingly, the oval hole having a long diameter and a short diameter is shaped at the lower hole H of the work piece WK. That is, in the present embodiment, the pin hole is shaped at the lower hole H of the work piece WK. Such a pin hole includes an oval through-hole of which inner diameter decreases in the inward direction from each of two outer openings.

Next, in a case where each of the oval hole and the inner-diameter-changing hole is shaped at the lower hole H of the work piece WK, the control apparatus 130 pulls the processing tool 102, which penetrates the work piece WK on the work table 110, out of the work piece WK and retreats the processing tool 102. Specifically, the control apparatus 130 controls actuation of the tool turnable-drive motor 105 to spin the processing tool 102 about the center axis $O_1$ and inwardly displace the position of the cutting blade 103 in the radial direction. Accordingly, the cutting blade 103 separates from the work piece WK. Further, the control apparatus 130 stops actuation of the table displacement motor 111a of the table reciprocatably-displacing mechanism 111 to stop reciprocatable displacement of the work table 110.

Subsequently, the control apparatus 130 controls actuation of the spindle feeding motor 107a to displace the processing tool 102 to the left end side as viewed in the figure and return the processing tool 102 to the original point. Thereafter, the control apparatus 130 stops actuation of the spindle drive motor 106. Accordingly, rotary drive of the processing tool 102 is stopped at an original point position outside the work piece WK on the work table 110. Then, the control apparatus 130 controls actuation of the work pressing motor 112b of the work pressing mechanism 112 to lift the pressing body 112a and cancel a clamped state of the work piece WK. In this manner, the operator can remove the work piece WK, in which each of the oval hole and the inner-diameter-changing hole is shaped at the lower hole H, from the work table 110.

Note that the step of arranging the work piece WK on the work table 110 and the step of removing the work piece WK from the work table 110 can be, other than the operator, also performed using a mechanical apparatus configured to perform arrangement of the work piece WK on the work table 110 and removal of the work piece WK from the work table 110 by computer control. Moreover, in the present embodiment, the step of clamping the work piece WK onto the work table 110 and the step of drilling the oval hole and the inner-diameter-changing hole at the work piece WK are executed as separate steps. These steps can be also executed as a series of steps.

As can be understood from description of actuation above, according to the above-described embodiment, the processing tool 102 turns by spinning while being rotatably driven on the circular path C in a state in which both ends of the processing tool 102 are supported by the spindle 101 and the auxiliary spindle 120 in the hole drilling machine 100. With this configuration, the cutting blade 103 approaches or separates from the work piece WK such that a cut amount changes. Thus, as compared to the case of reciprocatably displacing the work piece WK, the accuracy of position determination of the cutting blade can be also improved, and high-accuracy processing can be performed. In this case, in the hole drilling machine 100, the cutting blade 103 also approaches or separates from the work piece WK by reciprocatable displacement of the work table 110, and the cut amount changes accordingly. That is, the hole drilling machine 100 according to the present invention turns the processing tool 102 to shape the inner-diameter-changing hole and reciprocatably displaces the work table 110 to shape the oval hole, thereby performing two types of shaping processing by two mechanisms. Thus, the hole drilling machine 100 can also perform complicated hole drilling with high accuracy.

Further, implementation of the present invention is not limited to the above-described embodiment, and various changes can be made without departing from the object of the present invention.

For example, in the above-described embodiment, the hole drilling machine 100 is configured to reciprocatably displace the work piece WK in the X-axis direction by the table reciprocatably-displacing mechanism 111, thereby shaping the oval hole at the lower hole H of the work piece WK. However, the hole drilling machine 100 can be configured to change the amount of protrusion of the cutting blade 103 in the radial direction by the tool turnable-drive motor 105 in the tool holding mechanism 104 according to a rotation position of the processing tool 102, thereby shaping the oval hole at the lower hole H of the work piece WK. In this case, the control apparatus 130 controls actuation of the tool turnable-drive motor 105 so that not only the inner-diameter-changing hole but also the oval hole or at least one of the inner-diameter-changing hole or the oval hole can be shaped at the lower hole H of the work piece WK. That is, the hole drilling machine 100 can be configured without the table reciprocatably-displacing mechanism 111. In this case, in the hole drilling machine 100, the work table 110 may be provided in a fixed manner on the base of the hole drilling machine 100.

Moreover, in the above-described embodiment, in the hole drilling machine 100, the work pressing mechanism 112 configured to clamp the work piece WK on the work table 110 is, in an independent state, provided physically separately from the work table 110. With this configuration, the weight of the work table 110 is reduced and the work piece is stably supported on the work table reciprocatably displaced in the X-axis direction, and therefore, the table reciprocatably-displacing mechanism 111 can perform high-accuracy shaping processing. However, in the hole drilling machine 100, the work pressing mechanism 112 can be also provided in a state in which the work pressing mechanism 112 is supported on the work table 110. According to such a configuration, in the hole drilling machine 100, the entire configuration of the hole drilling machine 100 can be compactly made.

Further, in the above-described embodiment, the hole drilling machine 100 is configured such that the work position determination mechanism 121 including the position determination body 121*a* is, in an independent state, provided physically separately from the work table 110. With this configuration, the weight of the work table 110 is reduced and the work piece WK is stably supported on the work table reciprocatably displaced in the X-axis direction, and therefore, the table reciprocatably-displacing mechanism 111 can perform high-accuracy shaping processing. However, in the hole drilling machine 100, a jig or a tool equivalent to the work position determination mechanism 121 configured to define the position, orientation, and posture of the work piece WK on the work table 110 can be also provided in a stale in which the jig or the tool is supported on the work table 110.

In addition, in the above-described embodiment, the hole drilling machine 100 includes the selective arrangement mechanism 122. The selective arrangement mechanism 122 supports each of the auxiliary spindle 120 and the work position determination mechanism 121, integrally displaces these components, and selectively arranges these components such that these components face the work piece WK held on the work table 110. With this configuration, the hole drilling machine 100 can perform, by position determination of one of the work position determination mechanism 121 or the auxiliary spindle 120 with respect to the work piece WK on the work table 110, retreating of the other one of the work position determination mechanism 121 or the auxiliary spindle 120. Thus, a working efficiency can be improved. However, the hole drilling machine 100 can be also configured such that the auxiliary spindle 120 and the work position determination mechanism 121 are separately displaced.

Moreover, in the above-described embodiment, the hole drilling machine 100 is configured such that the processing of cutting the oval hole and the inner-diameter-changing hole is performed for the piston as the work piece WK, However, the hole drilling machine 100 can be also configured such that the processing of cutting at least one of the oval hole or the inner-diameter-changing hole is performed for other parts than the piston as the work piece WK.

LIST OF REFERENCE NUMERALS

WK work piece
H lower hole
$O_1$ center axis of spinning of processing tool
$O_2$ center axis of rotation of processing tool on circular path
    amount of displacement of work table in X-axis direction for drilling oval hole
C circular path for displacement of processing tool
100 hole drilling machine
101 spindle
102 processing tool
103 cutting blade 104 tool holding mechanism
104a tool holding tube
104b motion converter
104c inner tube
104d outer tube
105 tool turnable-drive motor
106 spindle drive motor
107 spindle feeding mechanism
107a spindle feeding motor
110 work table
111 table reciprocatably-displacing mechanism
111a table displacement motor
112 work pressing mechanism
112a pressing body
112b work pressing motor
120 auxiliary spindle
120a tool fitting portion
120b auxiliary spindle drive motor
121 work position determination mechanism
121a position determination body
121b position determination body drive motor
122 selective arrangement mechanism
122a selective arrangement mechanism drive motor
130 control apparatus
131 operation panel
132 exterior cover
133 opening/closing door

The invention claimed is:

1. A hole drilling machine comprising:
a work table configured to hold a work piece having a lower hole in a through-hole shape;
a spindle formed in a shape of a rod penetrating the lower hole of the work piece held on the work table and configured to spin a processing tool, which holds a cutting blade configured to cut the work piece, about an axis while holding one end portion of the processing tool to turnably displace the cutting blade about the axis and rotatably drive an entirety of the processing tool on a circular path about a center axis at a position eccentric with a center axis of spinning;
an auxiliary spindle having a tool fitting portion in which the other end side of the processing tool is slidably fitted and configured to rotatably drive the tool fitting portion on a circular path parallel with the circular path for the spindle;
a spindle displacement mechanism configured to displace the spindle and the work table relative to each other in a Y-axis direction as an axis direction of the spindle to decrease or increase a distance between the spindle and the work table; and
a control apparatus configured to control actuation of each of the spindle, the auxiliary spindle, and the spindle displacement mechanism,
wherein the control apparatus
turnably displaces the processing tool while displacing the processing tool in the Y-axis direction in a rotatably-driven state, thereby shaping, at the work piece, at least one of an oval hole or an inner-diameter-changing hole of which inner diameter changes along a hole depth direction.

2. The hole drilling machine according to claim 1, further comprising:
a work position determination mechanism configured to hold a rod-shaped position determination body penetrating the lower hole of the work piece held on the work table such that the position determination body approaches and penetrates or separates from the lower hole; and
a selective arrangement mechanism configured to integrally displace the auxiliary spindle and the work position determination mechanism to selectively arrange the auxiliary spindle and the work position determination mechanism such that the auxiliary spindle and the work position determination mechanism face the work piece held on the work table.

* * * * *